US012146239B2

(12) United States Patent
Stanishevsky et al.

(10) Patent No.: US 12,146,239 B2
(45) Date of Patent: Nov. 19, 2024

(54) METHOD FOR FABRICATING A TUBULAR STRUCTURE COMPOSED OF NANOFIBERS

(71) Applicant: THE UAB RESEARCH FOUNDATION, Birmingham, AL (US)

(72) Inventors: Andrei V. Stanishevsky, Birmingham, AL (US); Riley Yager, Birmingham, AL (US); Courtney Severino, Birmingham, AL (US)

(73) Assignee: THE UAB RESEARCH FOUNDATION, Birmingham, AL (US)

( * ) Notice: Subject to any disclaimer, the term of this patent is extended or adjusted under 35 U.S.C. 154(b) by 327 days.

(21) Appl. No.: 17/601,304

(22) PCT Filed: Apr. 3, 2020

(86) PCT No.: PCT/US2020/026700
§ 371 (c)(1),
(2) Date: Oct. 4, 2021

(87) PCT Pub. No.: WO2020/206339
PCT Pub. Date: Oct. 8, 2020

(65) Prior Publication Data
US 2022/0251732 A1 Aug. 11, 2022

Related U.S. Application Data

(60) Provisional application No. 62/829,164, filed on Apr. 4, 2019.

(51) Int. Cl.
*D01D 5/00* (2006.01)
*B01J 20/28* (2006.01)
*B01J 20/30* (2006.01)

(52) U.S. Cl.
CPC ...... *D01D 5/0092* (2013.01); *B01J 20/28023* (2013.01); *B01J 20/28035* (2013.01); *B01J 20/3007* (2013.01); *B01J 20/3078* (2013.01)

(58) Field of Classification Search
CPC .................................................. D01D 5/0092
See application file for complete search history.

(56) References Cited

U.S. PATENT DOCUMENTS

2003/0226750 A1   12/2003   Fenn
2006/0226580 A1   10/2006   Xie et al.
(Continued)

FOREIGN PATENT DOCUMENTS

WO   WO2008106381   *   9/2008
WO   2009102365 A2       8/2009

OTHER PUBLICATIONS

International Search Report for PCT?US20/06700 mailed Jul. 1, 2020.
(Continued)

*Primary Examiner* — Edmund H Lee
(74) *Attorney, Agent, or Firm* — Thomas | Horstemeyer, LLP

(57) ABSTRACT

An AC-electrospinning system and a method are provided for fabricating inorganic fiber tubular structures. The AC-electrospinning system preferably uses an electrode system that comprises an electrical charging component electrode and at least one of an AC field attenuating component and a precursor liquid attenuating component. Use of the AC-electrospinning process to fabricate the inorganic fiber tubular structures allows the structures to be made with high porosities that are not achievable using the conventional approach.

21 Claims, 11 Drawing Sheets

(56) References Cited

U.S. PATENT DOCUMENTS

| | | | |
|---|---|---|---|
| 2009/0162468 A1* | 6/2009 | Barinov | D01D 5/0076 |
| | | | 425/145 |
| 2010/0148404 A1* | 6/2010 | Smida | D02G 3/36 |
| | | | 425/66 |
| 2016/0002824 A1 | 1/2016 | Roach et al. | |
| 2020/0156945 A1* | 5/2020 | Holmberg | D01F 1/10 |

OTHER PUBLICATIONS

Pokorny, et al. "Effective AC needleless and collectorless electrospinning for yarn production", Royal Society of Chemistry, Sep. 2014.

Lawson, et al., "Rapid fabrication of Poly(e-caprolactone) nanofibers using needleless alternating current electrospinning", Journal of Applied Polymer Science, Sep. 2015.

Paulett, et al., "Effect of nanocrystalline cellulose addition on needleless alternating current electrospinning and properties of nanofibrous polyacrylonitrile meshes", Journal of Applied Polymer Science, May 2017.

Stanishevsky, et al., "Nanofibrous alumina structures fabricated using high-yield alternating current electrospinning", Ceramics International 42 (2016).

\* cited by examiner

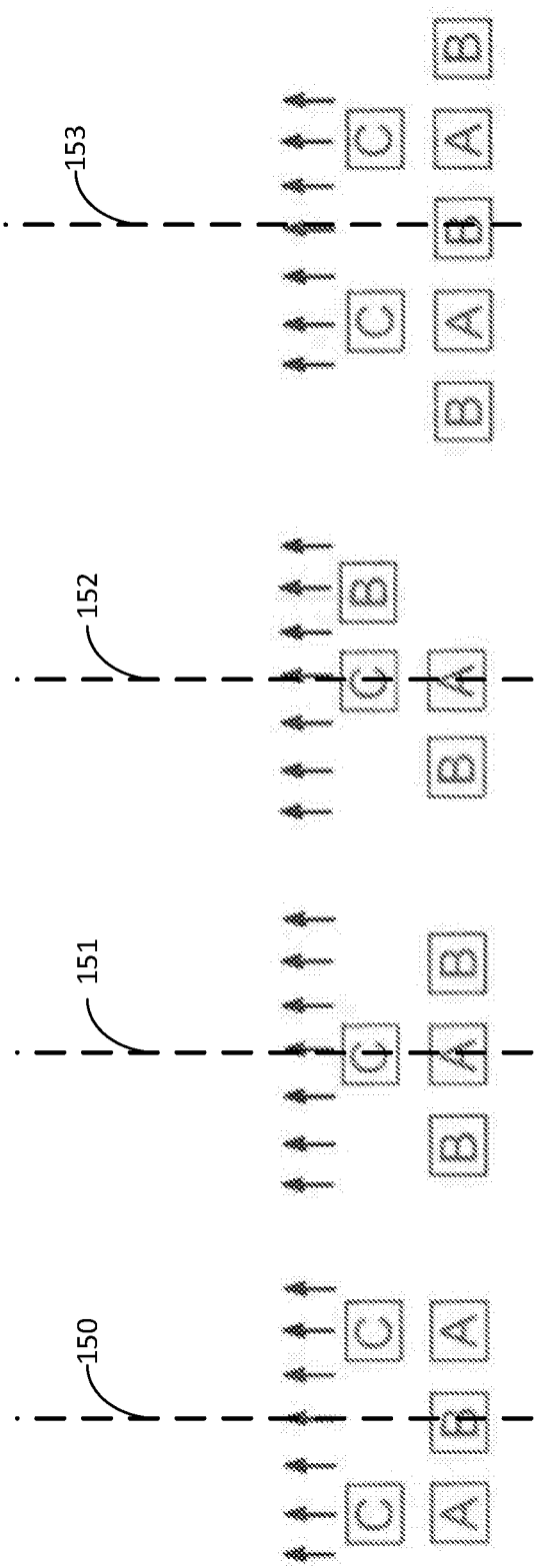
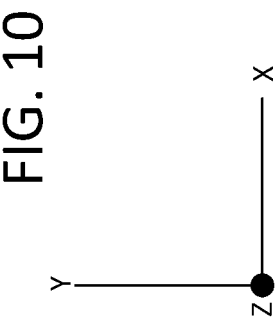

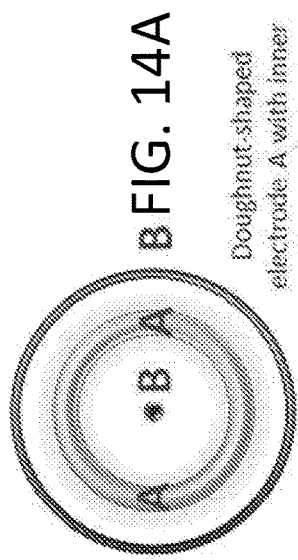
FIG. 12A
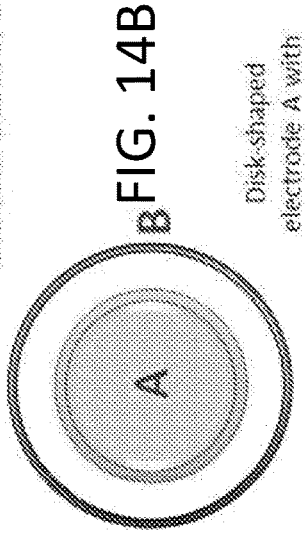
FIG. 12B
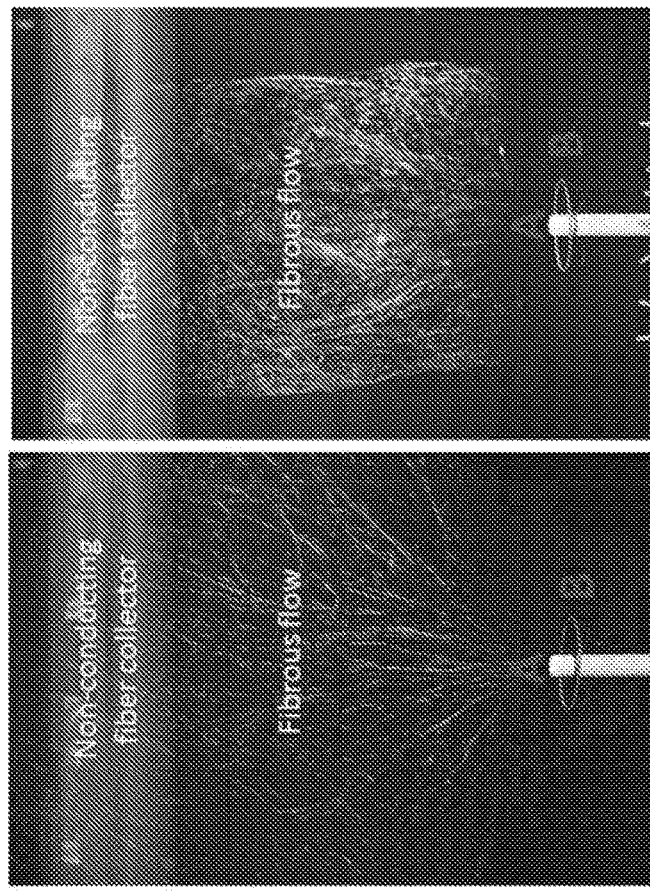
FIG. 13A     FIG. 13B
Same AC voltage is supplied to both the fluid-loaded electrode A and field attenuating electrode B
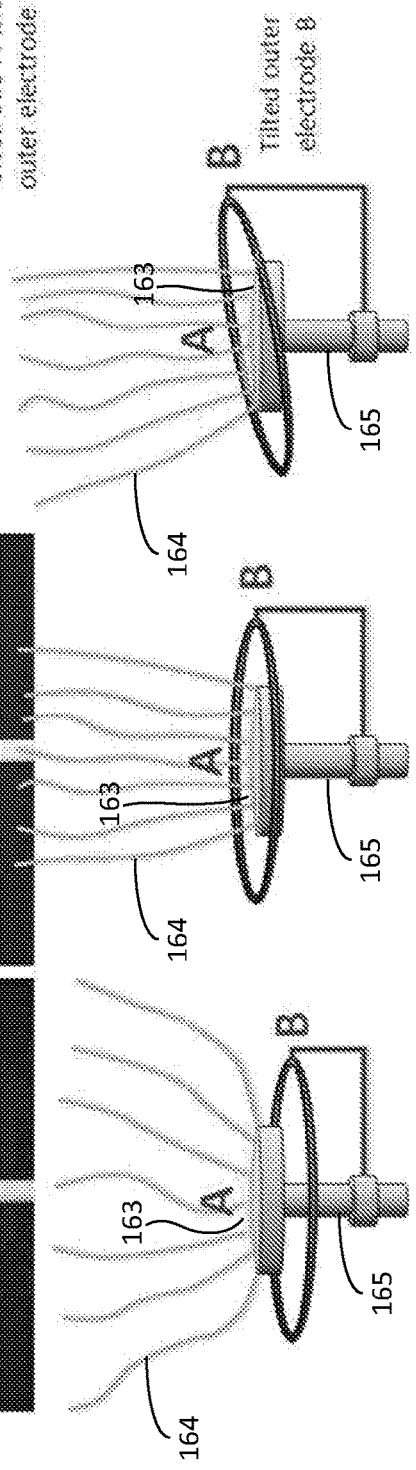
FIG. 14A — Doughnut-shaped electrode A with inner and outer electrode B
FIG. 14B — Disk-shaped electrode A with outer electrode B
FIG. 15 — Tilted outer electrode B

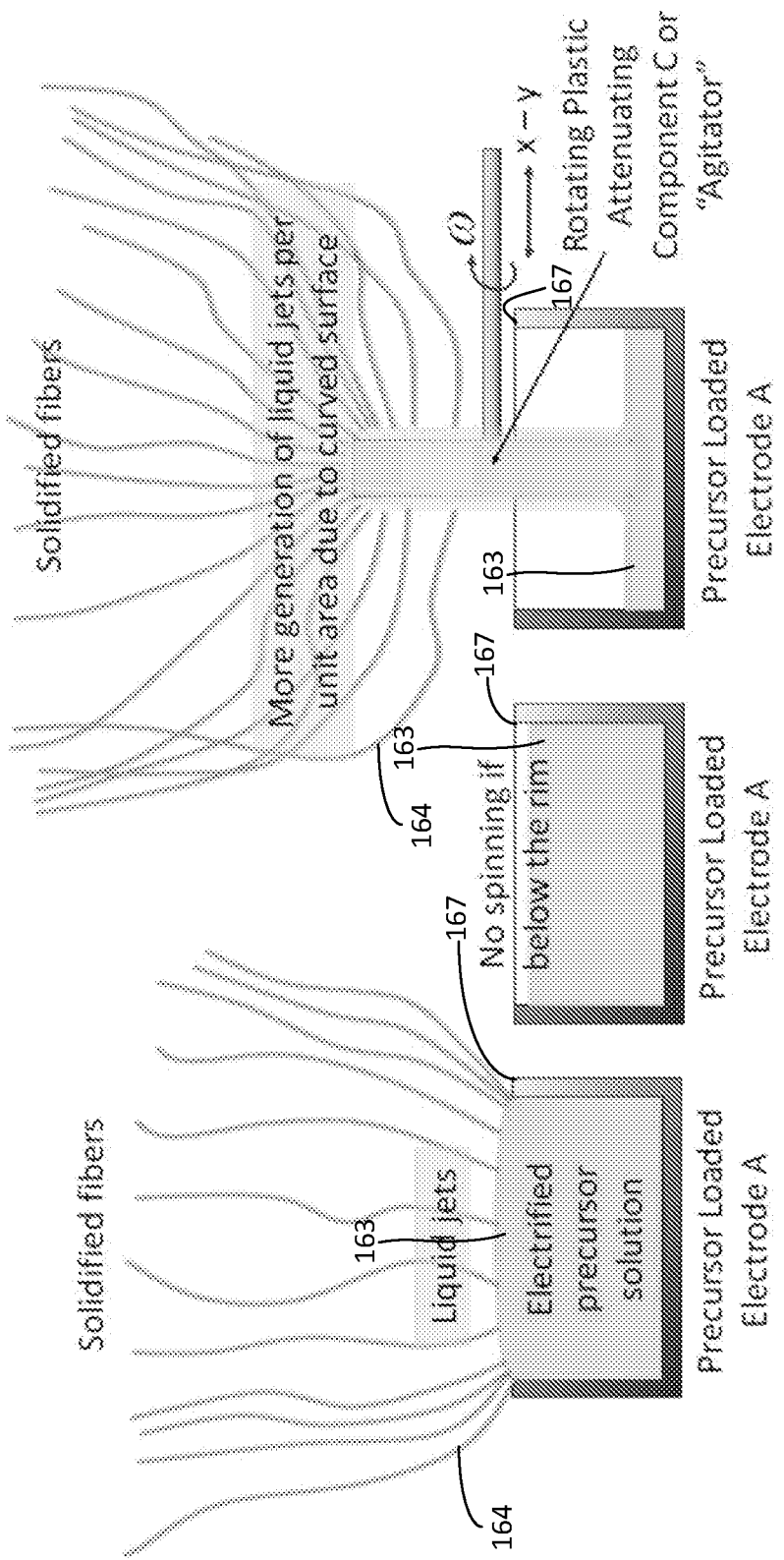

METHOD FOR FABRICATING A TUBULAR STRUCTURE COMPOSED OF NANOFIBERS

CROSS-REFERENCE TO RELATED APPLICATIONS

This application is a national stage entry pursuant to 35 U.S.C. § 371 of Patent Cooperation Treaty (PCT) international application No. PCT/US2020/026700, filed on Apr. 3, 2020, which claims priority to, and the benefit of the filing date of, U.S. provisional application No. 62/829,164, filed on Apr. 4, 2019, entitled "INORGANIC FIBER TUBULAR STRUCTURES, AND SYSTEM AND METHOD FOR MANUFACTURING THE INORGANIC FIBER TUBULAR STRUCTURES," both of which are incorporated herein by reference in its entirety their entireties.

TECHNICAL FIELD OF THE INVENTION

This invention relates to inorganic fiber tubular structures and a system and method for manufacturing inorganic fiber tubular structures.

BACKGROUND OF THE INVENTION

Ceramic membranes belong to the group of porous membranes, which means that their membrane structure consists of pores with a defined average pore size. Technically, ceramic membranes can be fixed on flat sheet supports as well as on tubular or multitubular supports. The flat sheet design is mainly used for lab size applications; for industrial applications, the usual design for ceramic membranes is tubular. The tubular or flat sheet support is made by extrusion, then multiple layers of the ceramic membrane material are applied to the tubular or flat sheet support. The porosity of most commercial ceramic membranes for micro-, ultra- and nano-filtration is usually in the 30 to 55% range.

The In accordance with a representative embodiment, geometries of the ceramic filter elements are responsible for ensuring that the hydraulic properties during the filtration/separation process are acceptable all over the membrane element. Therefore, the membrane elements are usually designed with tubular channels. Depending on the application and properties, such as viscosity and particle content, they are used in single-channel design or in multi-channel design. FIG. 1 shows a perspective view of a few typical geometries of known ceramic membranes. Fabrication of such structures by extrusion and depositing glass microfibers on a support has been reported.

SUMMARY

The present disclosure discloses inorganic fiber tubular structures and systems and methods for manufacturing the structures. The method for fabricating an inorganic fiber tubular structure comprises:

(a) disposing an alternating current (AC)-spinnable or sprayable precursor liquid in a reservoir of an electrode system of an AC-electrospinning system, the reservoir comprising a non-electrically conducting material, the electrode system comprising an electrical charging component electrode having at least one contact point that is in contact with the precursor liquid; and (b) delivering an AC signal to the electrical charging component electrode from an AC source that is electrically coupled to the electrical charging component electrode to place a predetermined AC voltage on the electrical charging component electrode, wherein placement of the predetermined AC voltage on the electrical charging component electrode results in electrospinning at least a first layer of fibrous material onto a collector disposed near the electrode system that collects the first layer of fibrous material.

In accordance with a representative embodiment, the collector is rotated about a central axis of the collector at a preselected rotational speed during spinning of the first layer of fibrous material onto the collector.

In accordance with a representative embodiment, the preselected rotational speed is adjusted based on at least one of a speed of flow of the first layer of fibrous material onto the collector and a porosity or density of the collected first layer of fibrous material.

In accordance with a representative embodiment, the method further comprises:

(c) compressing the first layer of fibrous material.

In accordance with a representative embodiment, the method further comprises:

(d) using a heating element disposed in and/or around the collector to subject the compressed first layer of fibrous material to heat to calcine the compressed first layer of fibrous material.

In accordance with a representative embodiment, the method further comprises:

(e) after calcining the compressed first layer of fibrous material, spraying or spinning at least a second layer of fibrous material onto the compressed and calcined first layer of fibrous material.

In accordance with another representative embodiment, the method further comprises:

(f) after spraying or spinning a second layer of fibrous material onto the compressed and calcined first layer of fibrous material, calcining the second layer of fibrous material.

In accordance with a representative embodiment, the method further comprises:

(g) after calcining the second layer of fibrous material, performing AC-spinning with the AC-electrospinning system to electrospin or electrospray a third layer of fibrous material onto the calcined third layer of fibrous material.

In accordance with a representative embodiment, the method further comprises:

(h) after performing AC-spinning to electrospin or electrospray the third layer of fibrous material onto the calcined third layer of fibrous material, compressing the third layer of fibrous material.

In accordance with a representative embodiment, the method further comprises:

(i) after compressing the third layer of fibrous material, calcining the third layer of fibrous material.

In accordance with a representative embodiment, the method further comprises:

(j) after calcining and/or sintering the third layer of fibrous material, removing the collector.

In accordance with a representative embodiment, the method further comprises:

(k) repeating two or more of steps (a) through (j) in the same order or in a different order to fabricate a multilayer inorganic fiber tubular structure having a preselected number of layers, each layer having a preselected thickness.

In accordance with a representative embodiment, the method further comprises:

exposing at least a portion of the fabricated tubular structure to a solution of inorganic material; and after exposing said at least a portion of the fabricated tubular structure to the solution of inorganic material, subjecting the fabricated tubular structure to a thermal treatment to provide the fabricated tubular structure with at least one of increased strength, additional functionality and suitability for integration into external devices or systems.

In accordance with a representative embodiment, the entire fabricated tubular structure has a porosity that is greater than or equal to 60%, and a plurality of the layers of fibrous material have porosities greater that 80%.

In accordance with a representative embodiment, the collector is a multi-bore collector comprising a plurality of layers of fibrous material.

In accordance with a representative embodiment, the collector is a single-bore collector.

In accordance with a representative embodiment, the electrode system further comprises:

at least one of an AC field attenuating component and a precursor liquid attenuating component.

In accordance with a representative embodiment, the electrode system comprises the AC field attenuating component, but not the precursor liquid attenuating component, and the predetermined AC voltage is also placed on the AC field attenuating component. The AC field attenuating component attenuates an AC field created by the placement of the predetermined AC voltage on the electrical charging component electrode.

In accordance with a representative embodiment, the electrical charging component electrode is doughnut-shaped, disk-shaped or rectangularly-shaped.

In accordance with a representative embodiment, the electrical charging component electrode has a top surface and a rim or lip that together define the reservoir such that the top surface of the electrical charging component electrode serves as a bottom of the reservoir.

In accordance with a representative embodiment, the electrode system comprises the precursor liquid attenuating component, but not the AC field attenuating component. The electrical charging component electrode has a top surface and a rim or lip that together define a reservoir for holding precursor liquid such that the top surface of the electrical charging component electrode serves as a bottom of the reservoir. The precursor liquid attenuating component facilitates fiber generation even in case where a level of the precursor liquid on the electrical charging component electrode is below the lip or rim of the electrical charging component electrode.

In accordance with a representative embodiment, the precursor liquid attenuating component is rotated as it contacts the precursor liquid.

In accordance with a representative embodiment, during spinning of the first layer of fibrous material, the collector is moved in at least one linear direction that is substantially parallel to the central axis of the collector.

In accordance with a representative embodiment, during spinning of the first layer of fibrous material, the collector is moved in at least one linear direction that is substantially perpendicular to the central axis of the collector.

In accordance with a representative embodiment, during spinning of the first layer of fibrous material, the collector is tilted such that the central axis of the collector is at a preselected angle that is greater than zero degrees and less than ninety degrees relative to a central axis of the electrical charging component electrode.

In accordance with a representative embodiment, the method further comprises:

forming a sacrificial layer that decomposes during calcination.

In accordance with a representative embodiment, the inorganic fiber tubular structure fabricated via the method is cylindrically shaped and the collector is removed.

In accordance with a representative embodiment, the inorganic fiber tubular structure is a filter and the first layer of fibrous material is a filter layer.

These and other features and advantages will become apparent from the following description, drawings and claims.

BRIEF DESCRIPTION OF THE DRAWINGS

FIGS. 8-11 depict examples of some of the possible electrode system configurations that use various arrangements components A, B and C.

FIGS. 12A and 12B show high-speed camera snap-shots of fibers generation during AC-electrospinning processes that use one of the electrode system configurations shown in FIGS. 8-11.

FIGS. 13A and 13B are side perspective views of two different electrode system configurations that comprise components A and B in accordance with a representative embodiment.

FIGS. 14A and 14B illustrate top plan views of two different electrode system configurations that can be configured with components A and B in accordance with representative embodiments.

FIG. 15 is a side perspective view of an electrode system configuration that comprises components A and B where component B is tilted relative to an axis of the electrode system configuration in accordance with a representative embodiment.

FIGS. 18-20 schematically illustrate fiber generation during AC-electrospinning for different configurations of the electrode system and different conditions of the precursor fluid relative to the component A electrode, in accordance with representative embodiments.

DETAILED DESCRIPTION OF AN ILLUSTRATIVE EMBODIMENT

Illustrative embodiments are disclosed herein of inorganic fiber tubular structures and of a high-yield AC-electrospinning system and method for manufacturing inorganic fiber tubular structures. The method comprises disposing an AC-spinnable precursor liquid in a reservoir of an electrode system of an AC-electrospinning system and delivering an AC signal to the electrical charging component electrode from an AC source that is electrically coupled to the electrical charging component electrode to place a predetermined AC voltage on the electrical charging component electrode. The reservoir comprises a non-electrically conducting material, the electrode system comprising an electrical charging component electrode having at least one contact point that is in contact with the precursor liquid. Placement of the predetermined AC voltage on the electrical charging component electrode results in electrospinning at least a first layer of fibrous material onto a collector disposed near the electrode system that collects the first layer of fibrous material.

Figure 1:
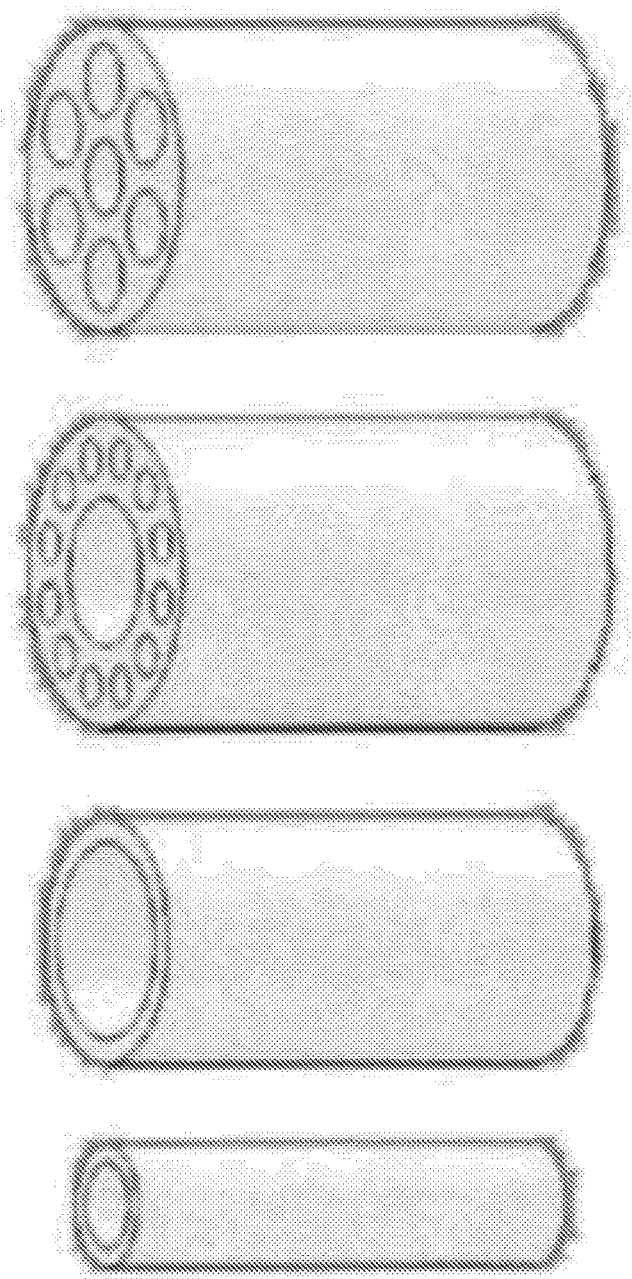
FIG. 1 shows a perspective view of a few typical geometries of known ceramic membranes.

The high-yield AC-electrospinning system used to manufacture the inorganic fiber tubular structures preferably uses a new electrode system that reduces or eliminates limitations and restrictions associated with current AC-electrospinning systems and methods while significantly improving the productivity of the AC-electrospinning system and method. The AC-electrospinning system and method are highly scalable, commercially feasible and capable of achieving a much higher porosity than current systems and methods used to produce tubular structures of the type described above and shown in FIG. 1. Results obtained using the system and method disclosed herein demonstrate that, in a few simple steps, such tubular structures can be fabricated with linear dimensions and characteristic diameters used by the industry (e.g., up to 1 meter (m) in length and up to 50 millimeters (mm) external diameter). In addition, the results obtained demonstrated that the tubular structures fabricated using the system and method disclosed herein can have even higher porosity than tubular structures currently available in the industry.

In the following detailed description, a few illustrative, or representative, embodiments are described to demonstrate the inventive principles and concepts. For purposes of explanation and not limitation, representative embodiments disclosing specific details are set forth in order to provide a thorough understanding of an embodiment according to the present teachings. However, it will be apparent to one having ordinary skill in the art having the benefit of the present disclosure that other embodiments according to the present teachings that depart from the specific details disclosed herein remain within the scope of the appended claims. Moreover, descriptions of well-known apparatuses and methods may be omitted so as to not obscure the description of the representative embodiments. Such methods and apparatuses are clearly within the scope of the present teachings.

The terminology used herein is for purposes of describing particular embodiments only, and is not intended to be limiting. As used in the specification and appended claims, the terms "a," "an," and "the" include both singular and plural referents, unless the context clearly dictates otherwise. Thus, for example, "a device" includes one device and plural devices. Relative terms may be used to describe the various elements' relationships to one another, as illustrated in the accompanying drawings. These relative terms are intended to encompass different orientations of the device and/or elements in addition to the orientation depicted in the drawings. It will be understood that when an element is referred to as being "connected to" or "coupled to" or "electrically coupled to" another element, it can be directly connected or coupled, or intervening elements may be present.

Exemplary, or representative, embodiments will now be described with reference to the figures, in which like reference numerals represent like components, elements or features. It should be noted that features, elements or components in the figures are not intended to be drawn to scale, emphasis being placed instead on demonstrating inventive principles and concepts.

The electrode system that is used in the AC-electrospinning system in accordance with a preferred embodiment comprises an electrical charging component electrode and at least one of an AC field attenuating component and a precursor liquid attenuating component. The electrical charging component electrode is electrically coupled to an AC source that delivers an AC signal to the electrical charging component electrode to place a predetermined AC voltage on the electrical charging component electrode. In cases in which the electrode system includes the AC field attenuating component, it attenuates the AC field generated by the electrical charging component electrode to better shape and control the direction of the fibrous flow. In cases in which the electrode system includes the precursor liquid attenuating component, it serves to increase fiber generation, even if the top surface of the liquid precursor is not ideally shaped or is below a rim or lip of the reservoir that contains the liquid on the electrical charging component electrode. Details of the electrode system are described below with reference to FIGS. 6A-20.

Prior to describing preferred embodiments of the electrode system, examples of tubular structures that can be manufactured by the AC-electrospinning system and method as well as a representative embodiment of the AC-electrospinning system and method will be described with reference to FIGS. 2-5.

Figure 2:
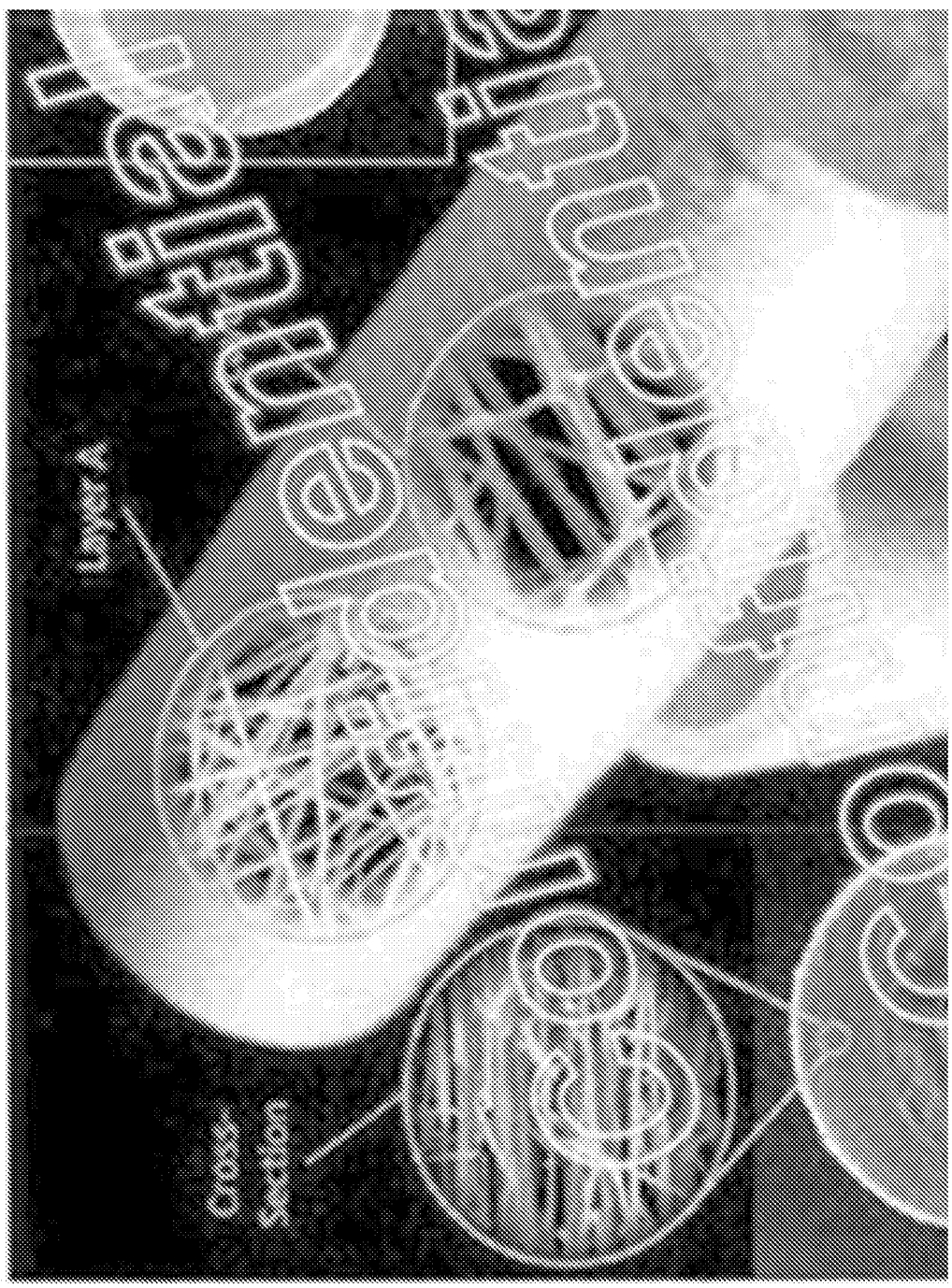
FIG. 2 shows samples of inorganic fiber tubular structures that were fabricated using an embodiment of the AC-electrospinning system and method.

FIG. 2 shows samples of inorganic fiber tubular structures that were fabricated using the AC-electrospinning system and method. The inorganic fiber tubular structures shown in FIG. 2 have diameters of up to 25 mm, porosities in the 75 to 99% range, and thermal stability up to 1400° C. The inorganic fiber tubular structures shown in FIG. 2 comprise micro- and nano-fiber materials of silica, alumina, zirconia, mullite, magnesium aluminate, titania, ceria, and their combinations. It should be noted, however, that the inorganic fiber tubular structures are not limited to being made of these materials. The mechanical strength (bending and compression) to apparent porosity ratios of fabricated structures shown in FIG. 2 exceeded those for traditional tubular ceramic membranes of the type shown in FIG. 1. The samples of the inorganic fiber tubular structures shown in FIG. 2 include single-bore tubular ceramic constructs comprising either one ceramic nanofiber layer (top right insert) or multiple ceramic micro- and nano-fiber layers (center and bottom left inserts). In the latter, partially-fused micro-fiber layers (layer B) serve primarily as an integrated structural support and nano-fiber layers (layer A) serve as the filtration/separation component. The samples in the photo were cut from a 300 mm-long sample.

The tubular supports of the inorganic fiber tubular structures can be made via the AC-electrospinning system and method or they can be supplied for use in the AC-electrospinning process. In accordance with a representative embodiment, the tubular support is also made using the AC-electrospinning system and method, i.e., layer B serves primarily as the integrated structural support and layer A serves as the filtration/separation component. In such cases, it is unnecessary to perform the aforementioned extrusion process to fabricate the tubular support. In other embodiments, the tubular support is supplied to the process, as is currently the practice in the industry, and acts as a collector upon which fibers are spun via the AC-electrospinning process of the present disclosure.

Figures 3A, 3B:
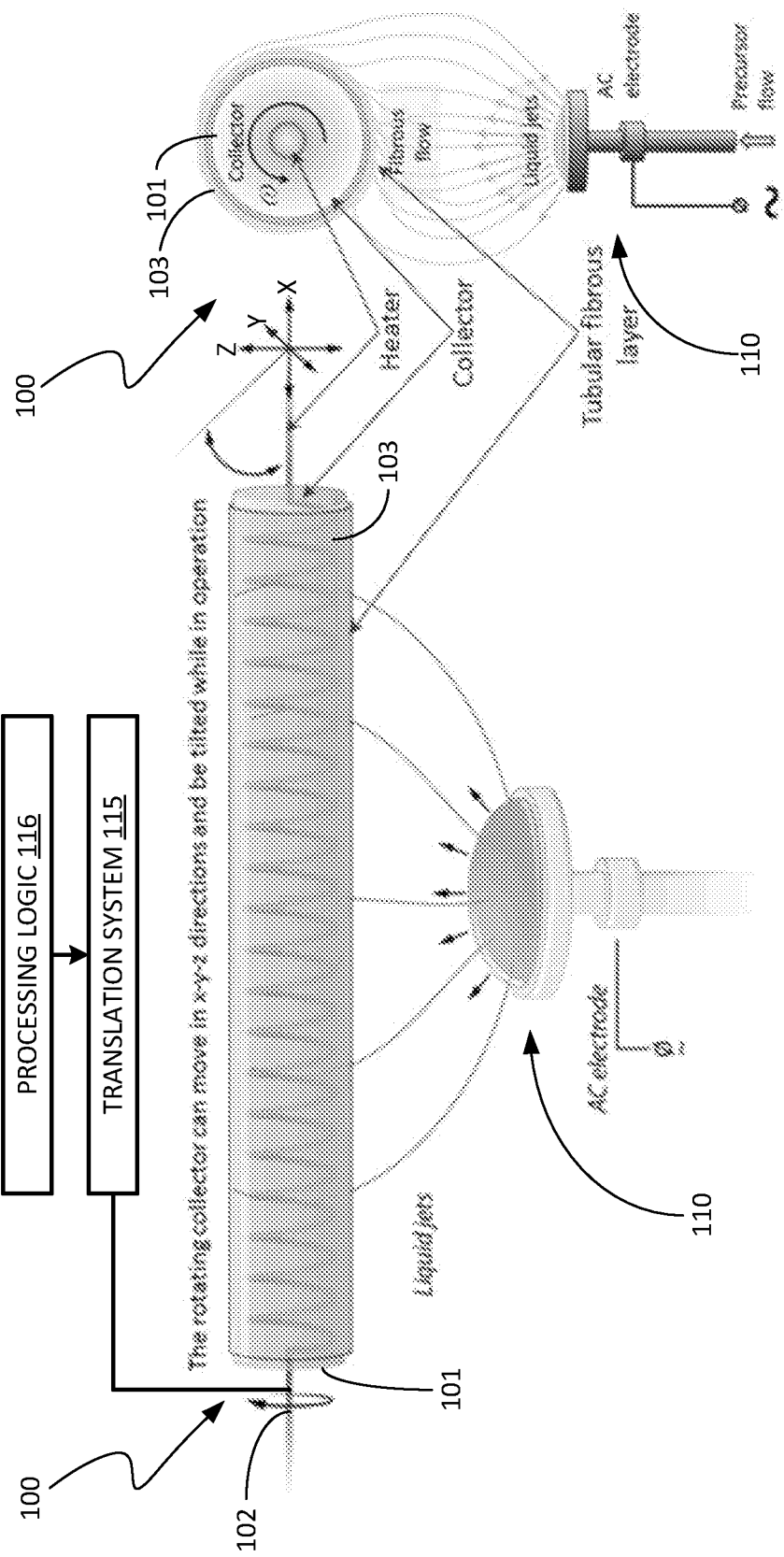
FIGS. 3A and 3B are front and side views of an AC-electrospinning system, respectively, in accordance with a representative embodiment that can be used to fabricate the structures shown in FIG. 2.

FIGS. 3A and 3B are front and side views of the AC-electrospinning system 100, respectively, in accordance with a representative embodiment. A cylindrically-shaped collector 101 of the system 100 is mechanically coupled to a translation system 115 that imparts preselected rotational motion to the collector 101 to cause the collector 101 to rotate about a central axis 102 of the collector 101. The central axis 102 of the collector 101 corresponds to an X-axis of an X-, Y-, Z-Cartesian coordinate system shown in FIG. 3A. In accordance with a representative embodiment, the translation system 115 is also capable of imparting preselected motion to the collector 101 in the linear X-, Y- and Z-directions and is capable of tilting the collector 101 in the X-Y, X-Z and Y-Z planes. Processing logic 116 outputs control signals to the translation system 115 to control motion parameters, such as, for example, the speed of rotation, the speed and distance of motion in the X-, Y- and Z-directions, the direction and angle of tilt, etc. The processing logic 116 typically receives user input from a user interface (not shown) that sets the motion parameter settings. An opened or closed feedback system (not shown) and/or a feed forward system (not shown) may also be included in the system 100 that would monitor the process and send signals to the processing logic 116 to control the process. Such signals may be used by the processing logic 116 in lieu of, or in combination with, user input to set the preselected motion parameters.

As the translation system 115 imparts preselected motion to the collector 101, an electrode system 110 of the AC-electrospinning system 100 receives a predetermined AC voltage that causes liquid jets comprising a fibrous flow to be generated from a precursor liquid that is supplied to the electrode system 110. The fibrous flow collects on the collector 101 to form one or more layers of fibers 103 on the collector 101. The collector 101 is subsequently removed, leaving only an inorganic fiber tubular structure comprising fibrous material having preselected characteristics (e.g., diameter(s), porosity, etc.), as will be described below in more detail.

Once a precursor fibrous layer is accumulated on the collector, the heater inside the collector can be turned on to dry and calcine the fibers. After that, another layer of the same or different precursor fibrous material can be accumulated, and the heating procedure repeated. This can be done a number of times. Layers can vary in thickness, density, fiber diameters, composition, etc.

Figure 4:
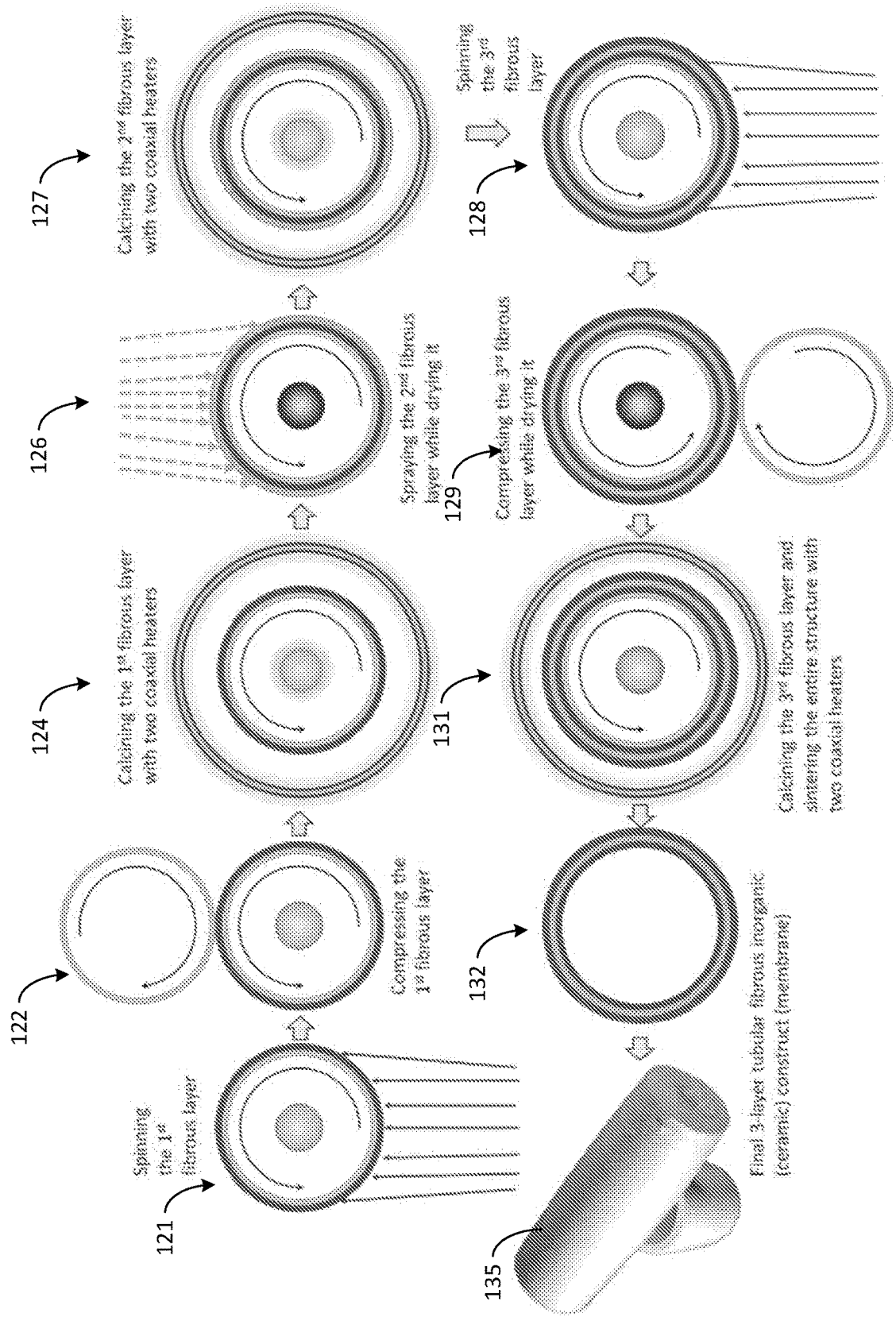
FIG. 4 depicts the process of fabricating an inorganic tubular structure with the system shown in FIGS. 3A and 3B in accordance with a representative embodiment.

FIG. 4 depicts the process of fabricating an inorganic tubular structure with the system 100 shown in FIGS. 3A and 3B in accordance with a representative embodiment. In accordance with this embodiment, a three-layer inorganic tubular structure is fabricated. In step 121, a first fibrous layer is spun or sprayed onto the collector via the AC-electrospinning process. The term "spun," as used herein, means spinning of the precursor liquid to form continuous fibers. The term "sprayed," as used herein, means spraying a sprayable precursor comprising a binder to form a layer of relatively short fibers that are fused together by the binder. Layers that are referred to herein as being "spun" may instead be "sprayed," and vice versa. Therefore, any layer referred to herein as being "spun" should be considered as layer that could instead be "sprayed," and vice versa.

In step 122, a compression process is performed during which the first fibrous layer is compressed. In step 124, two coaxial heaters are used to calcine the first fibrous layer. In step 126, a second fibrous layer is spun or sprayed onto the first fibrous layer while drying it. In step 127, two coaxial heaters are used to calcine the second fibrous layer. In step 128, a third fibrous layer is spun or sprayed onto the second fibrous layer via the AC-electrospinning process. In step 129, a compression process is perform during which the third fibrous layer is compressed while it is dried. In step 131, two coaxial heaters are used to calcine the third fibrous layer and to sinter the entire structure. In step 132, the collector is removed leaving the final three-layer fibrous inorganic (ceramic) structure (membrane) 135.

Thus, FIG. 4 shows an example of a single-bore tubular fibrous ceramic membrane fabrication process. AC-electrospinning is used to spin 2D-like fibrous precursor layers on ceramic or quartz cylindrical collector. The collector can, e.g., be periodically tilted while rotating and/or moving along the axis of collector to induce partial alignment of fibers along the axis of tubular construct. This helps to increase bending and compression strength of the construct. A cylindrical roller (e.g., Teflon, etc.) can used to compress a single layer or several fibrous layers (can be done together with mild heat-treatment) to modulate the total porosity. A layer made of short inorganic fibers or nanoparticles can be added by spraying to create a 3D-like layer for higher mechanical strength of the construct. Such sprayed layer contains a ceramic binder that fuses the sprayed fibers between each other and with electrospun layer during calcination and sintering. Such layer also controls the shrinkage of the entire structure. The fibrous layers are sequentially calcined by using internal and/or external heaters without removing the tubular fibrous construct from the collector. At the end, the calcined and sintered tubular construct is removed from the collector.

It should be noted that at any step in FIG. 4 during which calcination and/or sintering is performed, it can be performed in an oxidizing or non-oxidizing atmosphere. For example, steps 124, 127 and/or 131 may be performed in an oxidizing or non-oxidizing atmosphere, which can result in an oxide/carbide, carbide ceramic, or carbon/oxide ceramic composite, for example.

It should be noted that the flow diagram in FIG. 4 is an example of the process of fabricating an inorganic tubular structure with the system 100 shown in FIGS. 3A and 3B and that many variations can be made to the process depicted in FIG. 4 without deviating from the inventive principles and concepts. For example, additional steps not depicted in FIG. 4 can be added (e.g., to add more layers with different compositions) and steps depicted in FIG. 4 can be rearranged and/or removed.

Figure 5:
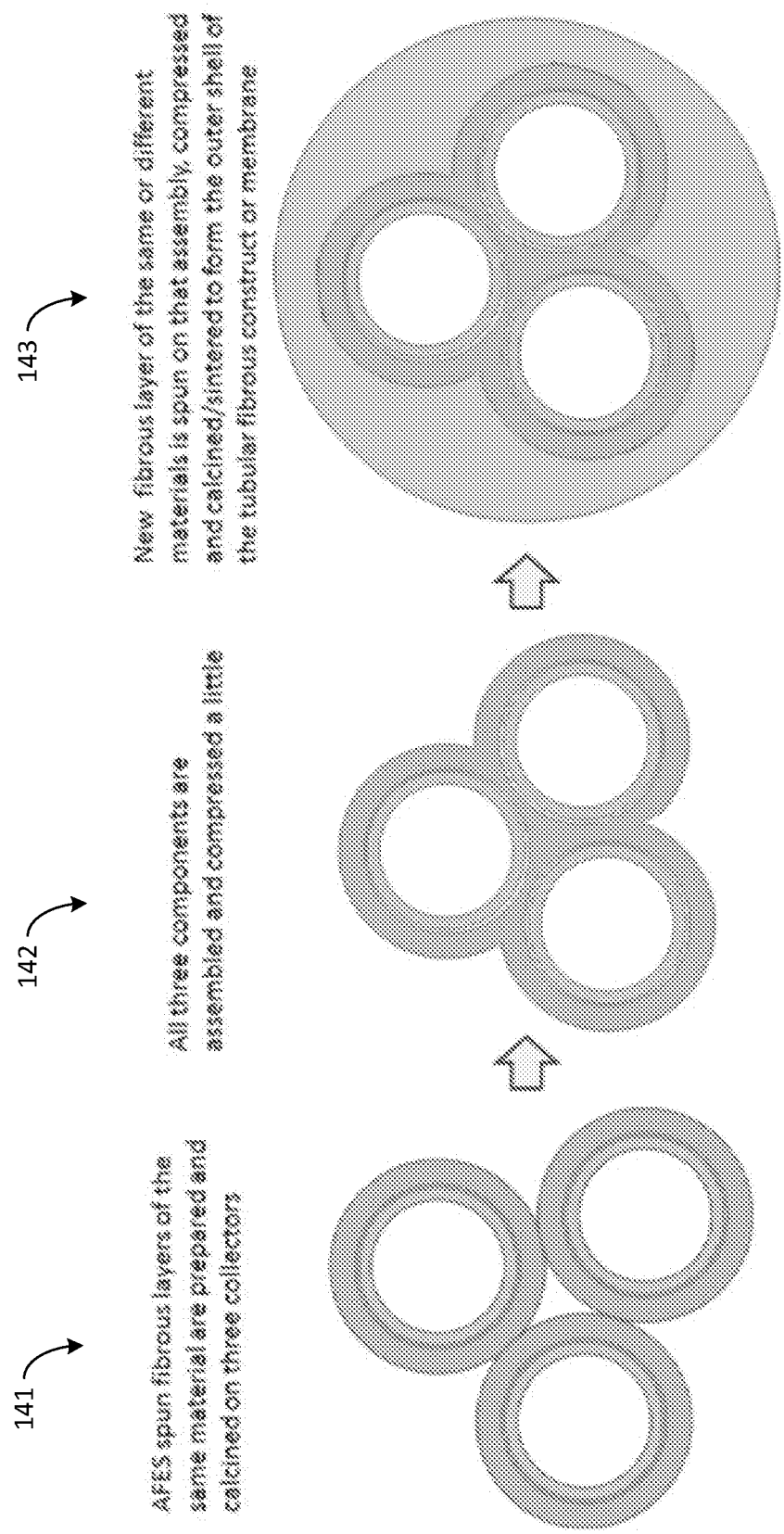
FIG. 5 shows the main steps of the AC-electrospinning process used to make a multi-bore tubular inorganic (ceramic) construct (membrane) that is then used as the collector upon which fibrous material is spun via AC-electrospinning.

FIG. 5 shows the main steps 141-143 of the AC-electrospinning process used to make a multi-bore tubular inorganic (ceramic) construct (membrane) that is then used as the collector upon which fibrous material is spun via AC-electrospinning. In step 141, fibrous layers of the same material are formed on three collectors via AC-electrospinning and calcined to form a multi-bore tubular inorganic structure. At step 142, the multi-bore tubular inorganic structure is slightly compressed. At step 143, AC-electrospinning is used to spin or spray a new fibrous layer of the same or different material onto the multi-bore tubular inorganic structure. The assembly is then compressed and calcined/sintered to form the outer shell of the multi-bore tubular inorganic structure.

Thus, in accordance with a representative embodiment, the method generally comprises generating precursor micro- and/or nanofibers from a source of inorganic material via electrospinning, collecting the fibers on a cylindrical collector, subjecting the layered collector to compression and thermal treatment, and removing the fabricated tubular inorganic structure from the collector. In accordance with an embodiment, the collector has two or more degrees of freedom and is made of materials capable of withstanding the thermal treatment. In accordance with an embodiment, the operations of fiber generation, collection, compression and thermal treatment are repeated to create a multilayer tubular inorganic construct. In accordance with an embodiment, the multilayers have various thicknesses and porosity, and are made of fibers with different composition, structure, diameter, degree of mutual fusion and/or alignment. In accordance with an embodiment, a plurality of fabricated tubular structures or constructs are assembled together along their main axes, and this assembly acts as the collector in procedures discussed above. In accordance with an embodiment, the precursor fibers and their tubular structures are made by AC-electrospinning. In accordance with an embodiment, the entire fabricated tubular structure or its parts are exposed to a solution containing a source of inorganic material, and then subjected to thermal treatment. In accordance with an embodiment, the fabricated tubular structure has more than 50% apparent porosity.

In accordance with an embodiment, the tubular structure is formed of a sequence of individual AC-spun fibrous layers and sprayed layers of short inorganic nanofibers, and the entire construct is calcined and/or sintered. It should be noted that the entire construct can be calcined/sintered at once, or each layer or group of layers can be calcined/sintered individually. In accordance with an embodiment, the short inorganic nanofibers are produced by chopping/crushing the partially or fully calcined fibrous sheets, followed by chemical, electrochemical, sol-gel, plasma or other type of modification of fiber surface. In accordance with an embodiment, a sacrificial layer is created (spun or sprayed) between the cylindrical collector and the first fibrous layer to compensate for shrinkage and to ensure easy removal of the entire fibrous tubular construct from the collector. Alternatively, the sacrificial layer, which is typically a polymer (e.g., cellulose) layer, can be spun or sprayed in between pre-ceramic layers that are formed later in the process.

Having described the system and process for making the tubular structures, a preferred embodiment of an electrode system for use in the AC-electrospinning system 100 shown in FIGS. 3A and 3B will be described with reference to FIGS. 6A-20.

Figures 6A, 6B:
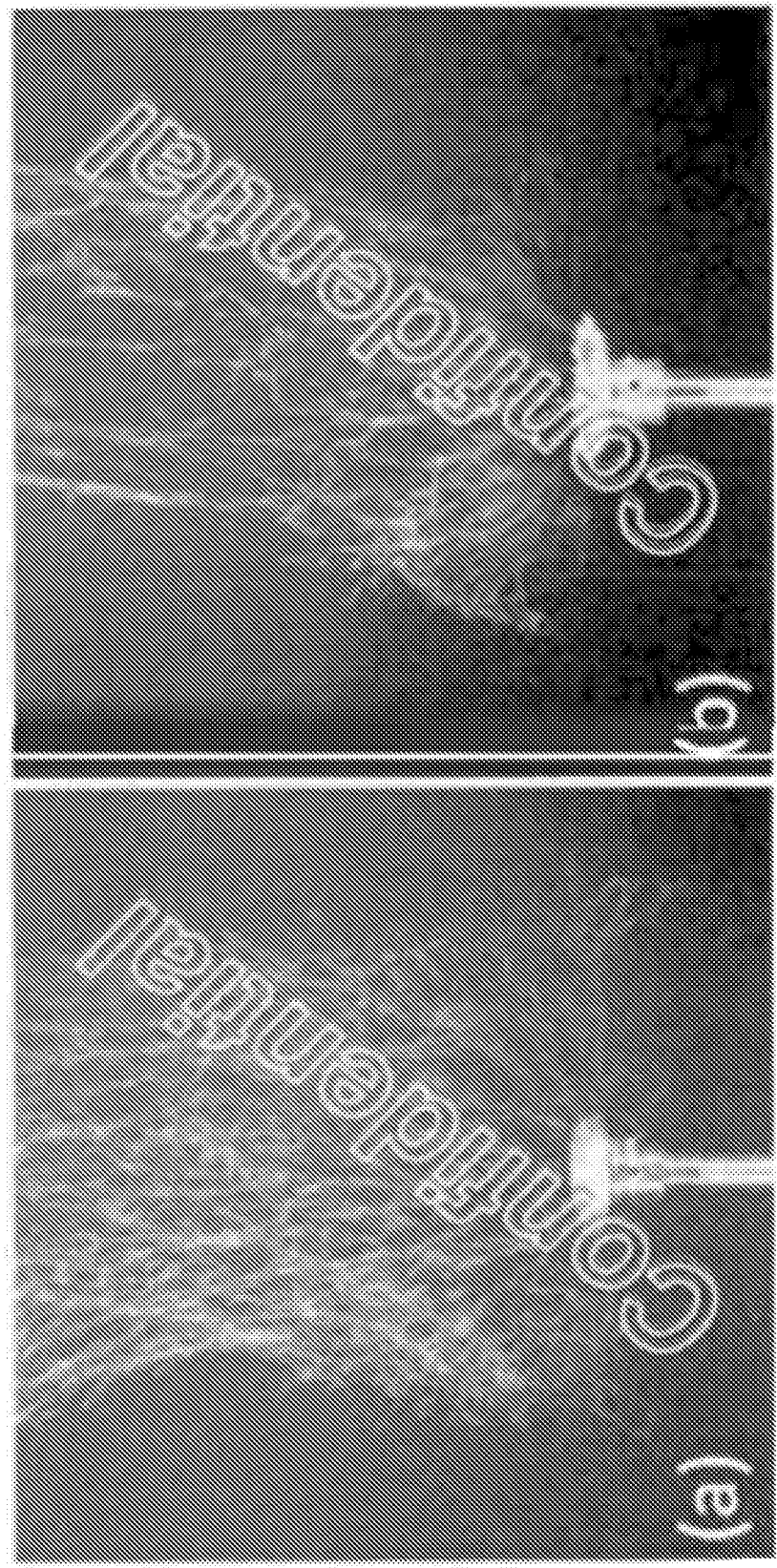
FIGS. 6A and 6B illustrate high-speed camera snap-shots taken of fibers being generated by a known AC-electrospinning process with a base "common" electrode design within one minute and ten minutes after the start of the process, respectively.

FIGS. 6A and 6B illustrate high-speed camera snap-shots of fibers being generated by a known AC-electrospinning process that uses an electrode having a base "common" electrode design. The snap-shot shown in FIG. 1A was taken within a minute after the start of the AC-electrospinning process. The snap-shot shown in FIG. 6B was taken 10 minutes after the start of the known AC-electrospinning process. Although AC-electrospinning is a relatively new process for high-yield production of microfibers and nanofibers, two significant problems with the known AC-electrospinning process have been identified, namely: (1) the poor spinnability of many precursors in AC-electrospinning processes that normally have good spinnability in DC-electrospinning processes; and (2) the accumulation of spun material at the outer edge of the electrodes that are typically used in AC-electrospinning due to the high rate of fiber generation and due to confinement of the fibers to the electrode by the electric field distribution.

Problem (1) restricts the precursors that can be used in AC-electrospinning whereas problem (2) quickly reduces fiber production yield and eventually results in termination of fiber generation. The result of problem (2) is visible in FIG. 6B, which shows a white "crown" of spun material that has formed around the electrode's outer edge. The resulting reduction in the upward flow of fibers caused by accumulation of the spun material at the electrode's outer edge is evident from a comparison of FIGS. 6A and 6B.

The AC-electrospinning system and method in accordance with the present disclosure overcome these limitations and restrictions. The present disclosure provides an electrode system for use in an AC-electrospinning system and process that not only reduces or eliminates material accumulation on the outer edge of the electrode, but also allows fibers to be generated from precursors that are not spinnable or that are poorly spinnable with typical electrode designs currently used in AC-electrospinning processes. By achieving these goals, the productivity of the AC-electrospinning method is greatly improved while also achieving much better control of fiber generation and propagation.

Figures 7A, 7B:
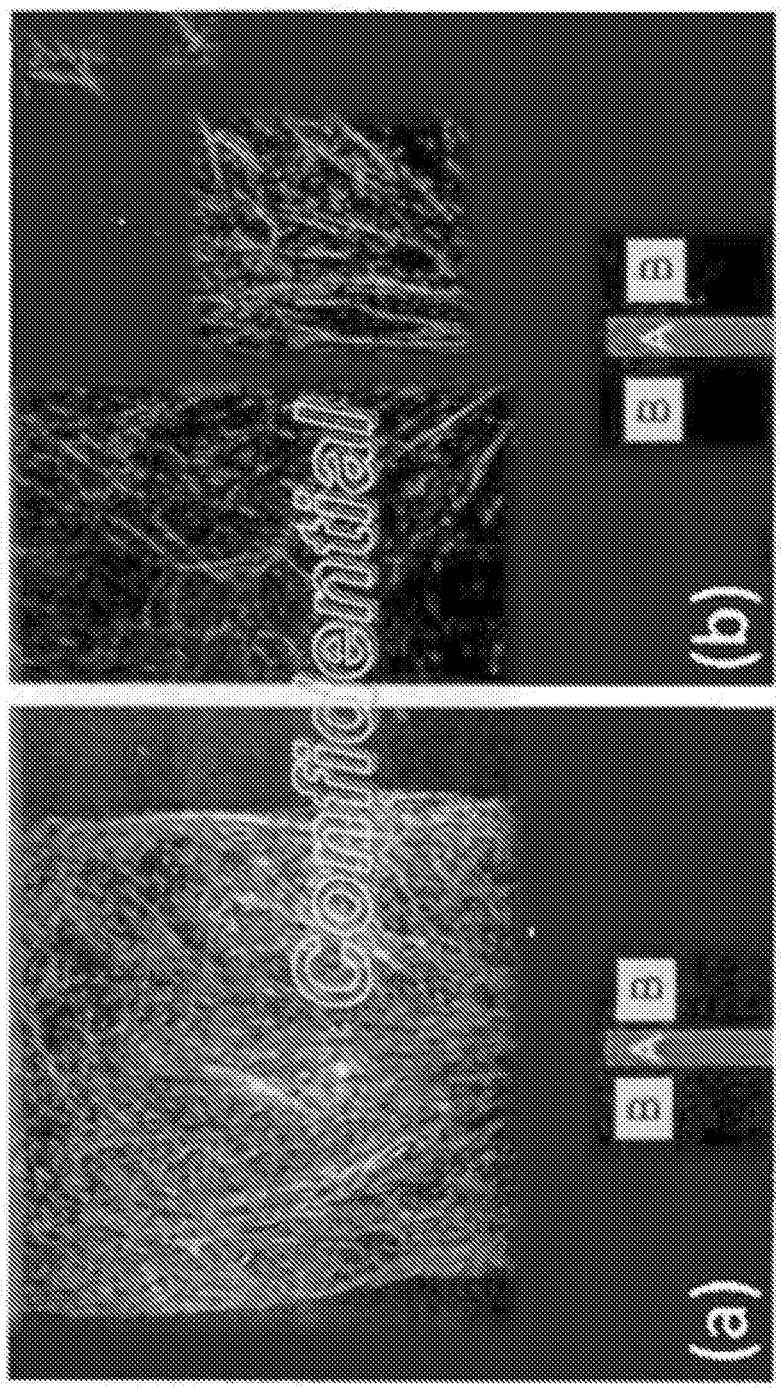
FIG. 7A shows a high-speed camera snap-shot of fibers generation during an AC-electrospinning process in accordance with a representative embodiment using a precursor X that is poorly-spinnable when used in known AC-electrospinning processes of the type depicted in FIGS. 6A and 6B.
FIG. 7B shows a high-speed camera snap-shot of fibers generation during an AC-electrospinning process in accordance with a representative embodiment using a precursor Y that is poorly-spinnable when used in known AC-electrospinning processes of the type depicted in FIGS. 6A and 6B.

FIG. 7A shows a high-speed camera snap-shot of fibers generation during an AC-electrospinning process in accordance with a representative embodiment. The fibers shown in FIG. 7A were generated using a precursor X that is poorly-spinnable when used in known AC-electrospinning processes of the type that is depicted in FIGS. 6A and 6B. FIG. 7B shows a high-speed camera snap-shot of fibers generation during an AC-electrospinning process in accordance with a representative embodiment. The fibers shown in FIG. 7B were generated using a precursor Y that is poorly-spinnable precursor when used in known AC-electrospinning processes of the type that is depicted in FIGS. 6A and 6B.

In the representative embodiments shown in FIGS. 7A and 7B, a new electrode comprising components labeled A and B was used in the AC-electrospinning system. The new electrode system can have a variety of configurations, as will be described below in more detail with reference to FIGS. 8-11. By using the new electrode system, the AC-electrospinning process achieves high spinnability using the previously poorly-spinnable precursors X and Y. In FIG. 7A, high spinnability of precursor X fibers has been reached with a uniform columnar fiber flow. In FIG. 7B, cone-like flow of precursor Y fibers is attained. To provide some idea of the scale of fibers generation, the width of the photos shown in FIGS. 7A and 7B is about 250 millimeters (mm). It should be noted that the inventive principles and concepts are not limited with regard to the precursors that are used in the AC-electrospinning process or with regard to the thicknesses of the generated fibers.

As indicated above, the electrode system of the present disclosure not only reduces or eliminates the material accumulation at the outer edge of the electrode, but also allows fibers to be generated from precursors that are not spinnable or that are poorly spinnable with typical electrode designs used in AC-electrospinning processes. Additionally, the electrode system of the present disclosure further increases AC-electrospinning productivity and allows much better control over fiber generation and propagation.

In accordance with a representative embodiment, the electrode system configuration comprises at least component A, and typically comprises component A and at least one of components B and C. Component A is an electrical charging component electrode. Component B is an AC field attenuating component. Component C is a precursor liquid attenuating component that is a rotating, non-electrically conductive component. In accordance with a preferred embodiment, when the electrode system configuration includes component A and at least one of components B and C, at least two of the components are arranged such that they have at least one common axis of symmetry.

The electrode system for AC-electrospinning in accordance with the inventive principles and concepts can have a variety of configurations, some of which are shown in FIGS. 8-11 and have the following attributes:

1) The electrode system configuration has an electrical charging component electrode (component A) and at least one of an AC field attenuating component (referred to interchangeably herein as "component B") and a precursor liquid attenuating component (referred to interchangeably herein as "component C") with at least one common axis of symmetry.
2) The components comprising the electrode system configuration, whether an A-B component configuration, an A-C component configuration, or A-B-C component configuration, are optimally located with respect to each other.
3) At least one of the components of the electrode system configurations having the attributes described above in 1) is non-electrically conductive.
4) All of the components of the electrode system configurations having the attributes described above in 1) can be moved relative to each other with at least one degree of freedom (either translation or rotation).
5) At least one of the components of the electrode system configuration having the attributes described above in 1) includes a magnetic element. The magnetic element, however, may be present in any or all of components A, B and C for mechanical coupling of the parts to enable them to be quickly exchanged, thereby making the system more adaptable for different processes.
6) If the electrode system configuration having the attributes described above in 1) includes component C, component C is located in the primary direction of fiber generation (upward) and flow propagation with respect to component A.
7) If the electrode system configuration having the attributes described above in 1) includes component C, component C does not have direct electrical contact with either component A or with component B.
8) Any of the electrode system configurations having the attributes described above in 1) (A-B, A-C or A-B-C) can be grouped in a multi-electrode arrangement.

Examples of some of the possible electrode system configurations having at least some of the attributes given above in 1)-8) are shown in FIGS. 8-11. The electrode configuration shown in FIG. 8 has components A, B and C. Component B is located along a central axis 150 of the electrode system and has side walls that are surrounded by component A in the X-direction, also referred to herein as the lateral direction. Component B may be a circular ring, for example. Component B may be a solid element having a circular, cylindrical or rectangular cross-section. Component C is stacked on top of component A. Component C can have any shape that allows it to rotate, such as, for example, the shape of a cylinder, a ring, a sphere, a disc, etc. Component B may be recessed relative to component C, i.e., the Y-coordinate of B is smaller than the Y-coordinate of C. Components A and C may rotate relative to the central axis 150, which is parallel to the Y-axis of the X, Y, Z Cartesian coordinate system shown beneath FIGS. 8-11. Component B may be movable along the central axis 1.

The electrode system configuration shown in FIG. 8 can be modified in a number of ways. For example, component C shown in FIG. 8 may be eliminated leaving the electrode system with an A-B configuration. As another example, component B shown in FIG. 8 may be eliminated leaving the electrode system with an A-C configuration. In all cases, in the configuration shown in FIG. 8, central axis 150 is a common axis for all of the components, regardless of whether the electrode system configuration has an A-B, A-C or A-B-C configuration. Thus, the system configuration shown in FIG. 8 has attribute 1). Whichever components are used to form the electrode system configuration shown in FIG. 8, the components can be optimally located relative to one another, which meets attribute 2). At least one of the components can be electrically non-conductive to meet attribute 3). All of the components making up the configuration of FIG. 8 can be moved relative to each other with at least one degree of freedom to meet attribute 4). For example, components A and C may rotate relative to the central axis 150 while component B may be movable along the central axis 150. At least one of components A, B or C can be a magnetic element to meet attribute 5). In FIG. 8, component C is located in the primary direction of fiber generation and flow propagation to meet attribute 6). Component C is spaced apart from components A and B so that there is no direct electrical connection between component C and components A and B, which meets attribute 7. This attribute can also be achieved by placing dielectric materials or spacers between components as needed. Multiple electrodes having the configuration shown in FIG. 8 can be grouped together to achieve a multi-electrode arrangement that meets attribute 8).

The electrode configuration shown in FIG. 9 has components A, B and C. Component A is located along a central axis 151 of the electrode system and has side walls that are surrounded by component B in the lateral directions. Component B may be a circular ring, for example. Component A may be a solid element having a circular, cylindrical or rectangular cross-section. Component C may also be a solid element having a circular, cylindrical or rectangular cross-section, and may be stacked on top of component A. Component B may rotate relative to the central axis 151, which is parallel to the Y-axis of the X, Y, Z Cartesian coordinate system shown beneath FIGS. 8-11. Components A and B may be movable along the central axis 151.

The electrode system configuration shown in FIG. 9 can be modified in a number of ways. For example, component C shown in FIG. 9 may be eliminated leaving the electrode system with an A-B configuration, which is essentially what is shown in FIGS. 7A and 7B, except that in FIGS. 7A and 7B, component A is protruding along the central axis 11 relative to component B. As another example, component B shown in FIG. 9 may be eliminated leaving the electrode system with an A-C configuration. In all cases, in the configuration shown in FIG. 9, central axis 151 is a common axis for all of the components, regardless of whether the electrode system configuration has an A-B, A-C or A-B-C configuration. Thus, the system configuration shown in FIG. 9 has attribute 1). Whichever components are used to form the electrode system configuration shown in FIG. 9, the components can be optimally located relative to one another, which meets attribute 2). Component C can be electrically non-conductive to meet attribute 3). Normally, components A and B are electrically conductive and component C is electrically non-conductive. All of the components making up the configuration shown in FIG. 9 can be moved relative to each other with at least one degree of freedom to meet attribute 4). For example, component B may rotate relative to the central axis 151 while components A and C may be movable along the central axis 11. At least one of components A, B or C can contain a magnetic element to meet attribute 5). In FIG. 9, component C is located in the primary direction of fiber generation and flow propagation to meet attribute 6). Component C is spaced apart from components A and B so that there is no direct electrical connection between component C and components A and B, which meets attribute 7. This attribute can also be achieved by placing dielectric materials or spacers between components as needed. Multiple electrodes having the configuration shown in FIG. 9 can be grouped together to achieve a multi-electrode arrangement that meets attribute 8).

The electrode configuration shown in FIG. 10 has components A, B and C. Components A and C are located along a central axis 152 of the electrode system and has one lateral side that is adjacent to component B. If component C is ring-shaped, it must rotate about its central axis normal to the plane of the ring. Component A may be a solid element having circular, cylindrical or ring-shaped cross-sections. Component C may be stacked on top of component A. Component B may move in the X-Z plane, for example. Components A and C may be movable along the central axis 152. Component B may be movable in the Y-direction parallel to the central axis 152. Components A and/or C may be movable in the X-Z plane perpendicular to the central axis 152.

The electrode system configuration shown in FIG. 10 can be modified in a number of ways. For example, component C shown in FIG. 10 may be eliminated leaving the electrode system with an A-B configuration. As another example, component B shown in FIG. 10 may be eliminated leaving the electrode system with an A-C configuration. In all cases, in the configuration shown in FIG. 10, central axis 152 is a common axis for at least components A and C. Thus, the system configuration shown in FIG. 5 has attribute 1). Whichever components are used to form the electrode system configuration shown in FIG. 10, the components can be optimally located relative to one another to meet attribute 2). At least one of the components shown in FIG. 10 can be electrically non-conductive to meet attribute 3). As described above, all of the components making up the configuration shown in FIG. 10 can be moved relative to each other with at least one degree of freedom to meet attribute 4). At least one of components A, B or C shown in FIG. 10 can be a magnetic element to meet attribute 5). In FIG. 10, component C is located in the primary direction of fiber generation and flow propagation to meet attribute 6). Component C is spaced apart from components A and B so that there is no direct electrical connection between component C and components A and B, which meets attribute 7. This attribute can also be achieved by placing dielectric materials or spacers between components as needed. Multiple electrodes having the configuration shown in FIG. 10 can be grouped together to achieve a multi-electrode arrangement that meets attribute 8).

The electrode configuration shown in FIG. 11 has components A, B and C. Component A is located along a central axis 153 of the electrode system and has non-electrically conducting side walls that are surrounded by component B in the lateral directions. Component A may be a circular ring or rectangular box for example. The Component B that is located on the central axis 153 may be a solid element having a circular, cylindrical or rectangular cross-section. The component B that is the outermost component may be a ring, for example. Component C may be stacked on top or partially inside of component A and rotate about its axis and/or move along the surface of component A. In such cases, component C can be cylindrically or spherically shaped. Components A and B that are ring-shaped may rotate relative to the central axis 153, which is parallel to the Y-axis of the X, Y, Z Cartesian coordinate system. Components A, B and C that are not ring-shaped may be movable along the axes that are parallel to the X-, Y- and/or Z-directions.

The electrode system configuration shown in FIG. 11 can be modified in a number of ways. For example, component C shown in FIG. 11 may be eliminated leaving the electrode system with an A-B configuration. As another example, component B shown in FIG. 11 may be eliminated leaving the electrode system with an A-C configuration. In all cases, in the configuration shown in FIG. 11, central axis 153 is a common axis for all of the components, regardless of whether the electrode system configuration has an A-B, A-C or A-B-C configuration. Thus, the system configuration shown in FIG. 11 has attribute 1). Whichever components are used to form the electrode system configuration shown in FIG. 11, the components can be optimally located relative to one another to meet attribute 2). At least one of the components shown in FIG. 11 can be electrically non-conductive to meet attribute 3). As described above, all of the components making up the configuration shown in FIG. 11 can be moved relative to each other with at least one degree of freedom to meet attribute 4). At least one of components A, B or C can be a magnetic element to meet attribute 5). In FIG. 11, component C is located in the primary direction of fiber generation and flow propagation to meet attribute 6). Component C is spaced apart from components A and B so that there is no direct electrical connection between component C and components A and B, which meets attribute 7. This attribute can also be achieved by placing dielectric materials or spacers between components as needed. Multiple electrodes having the configuration shown in FIG. 11 can be grouped together to achieve a multi-electrode arrangement that meets attribute 8). It should also be noted that electrode systems having the configurations shown in FIGS. 8-11, or modifications thereof, can be grouped together to form a multi-electrode arrangement.

Suitable materials for component A include, but are not limited to, metals and alloys with good resistance to common solvents, acids and bases. Stainless steel is an example of a suitable material for component A. Suitable materials for component B, which normally does not come into contact with fluids, include, but are not limited to, copper, aluminum and stainless steel metals and alloys with good resistance to common solvents, acids and bases. Suitable materials for component C, which is in contact with fluids, include, but are not limited to, Teflon, polypropylene, and other chemically-stable polymers with low dielectric constants.

FIGS. 12A and 12B show high-speed camera snap-shots of fibers generation during AC-electrospinning processes that use one of the new electrode system configurations described above with reference to FIGS. 8-11. FIGS. 13A and 13B are side perspective views of examples of different electrode system configurations that comprise components A and B. FIGS. 14A and 14B illustrate top plan views of examples of different electrode system configurations that can be configured with components A and B. With the configuration shown in FIG. 14A, component A is doughnut-shaped electrode and component B comprises an inner and outer electrode. With the configuration shown in FIG. 14B, component A is a disk-shaped electrode and component B comprises an outer electrode. It should be noted that the exemplary configurations shown in FIGS. 13A-14B are provided to demonstrate a few examples of the inventive principles and concepts and are not intended to be limiting, as will be understood by those of skill in the art in view of the description provided herein.

With any of these electrode system configurations, precursor fluid 163 is loaded onto a top surface of the component A. The precursor fluid 163 is typically pumped via a pump (not shown) through a tube 165 of the electrode system configuration to the top surface of the component A electrode. The same AC voltage is applied to the component A and B electrodes. Liquid jets are generated when the AC electric field is applied to the components A and B. As depicted in FIGS. 13A and 13B, fibers 164 form when the solvent in the precursor fluid 163 evaporates and the fibrous flow is drawn away for the component A electrode by the "ionic wind" phenomenon.

In many cases, in the absence of component B, which is the AC field attenuating component, the fibrous jets spread too much or they are difficult to initiate. Also, in the absence of component B, the fibrous residue mentioned above may form around the rim of component A. Component B is a field attenuating electrode that operates at the same AC voltage from the same source as component A. The field attenuating effect of component B improves fiber generation, improves the shape of the fibrous flow (FIG. 13B), and allows the flow direction to be controlled (FIGS. 12B and 13B). Component B is normally positioned around component A, but can also have an inner part (FIG. 14A) in the case of a hollow or doughnut-shaped component A (FIG. 14A). In FIGS. 12A through 14B, component B is shown as being ring-shaped and circular. However, component B can have other shapes. For example, component B could have the shape of a rectangle (e.g., a square).

As shown in FIG. 15, component B can be tilted with respect to a center axis of component A that is coaxial with the tube 165 to control the flow direction. In some embodiments, a translation mechanism (not shown) mechanically coupled to component B electrode allows a user to control the position, orientation and/or degree of tilt of component B to allow the field attenuating effect of component B to be adjusted to better control fiber generation, the shape of the fibrous flow and/or the direction of the fibrous flow.

Figure 16:
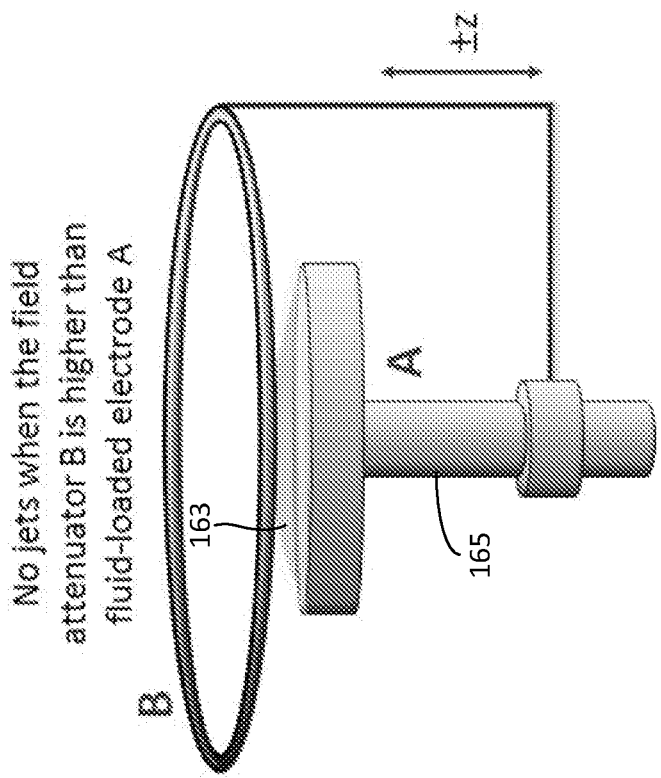
FIG. 16 is a side perspective view of an electrode system configuration comprising components A and B in accordance with a representative embodiment.

FIG. 16 is a side perspective view an electrode system configuration comprising the component A electrode and component B in accordance with a representative embodiment. If the precursor fluid 163 does not have an optimum surface profile (convex) on the top surface of the component A electrode, jets are difficult to initiate or even impossible in some cases. If there is too much precursor fluid 163 on the top surface of the component A electrode, the fluid 163 can overflow the component A electrode and spill, requiring the AC-electrospinning process to be halted. On the other hand, if the fluid level is at or below the edge of the lip or rim of the component A electrode, as will be described below in more detail with reference to FIG. 19, jet generation typically ceases. Also, if component B is raised (in the +z direction) above the upper surface of the precursor fluid 163, as shown in FIG. 16, jet generation typically ceases.

Figure 17:
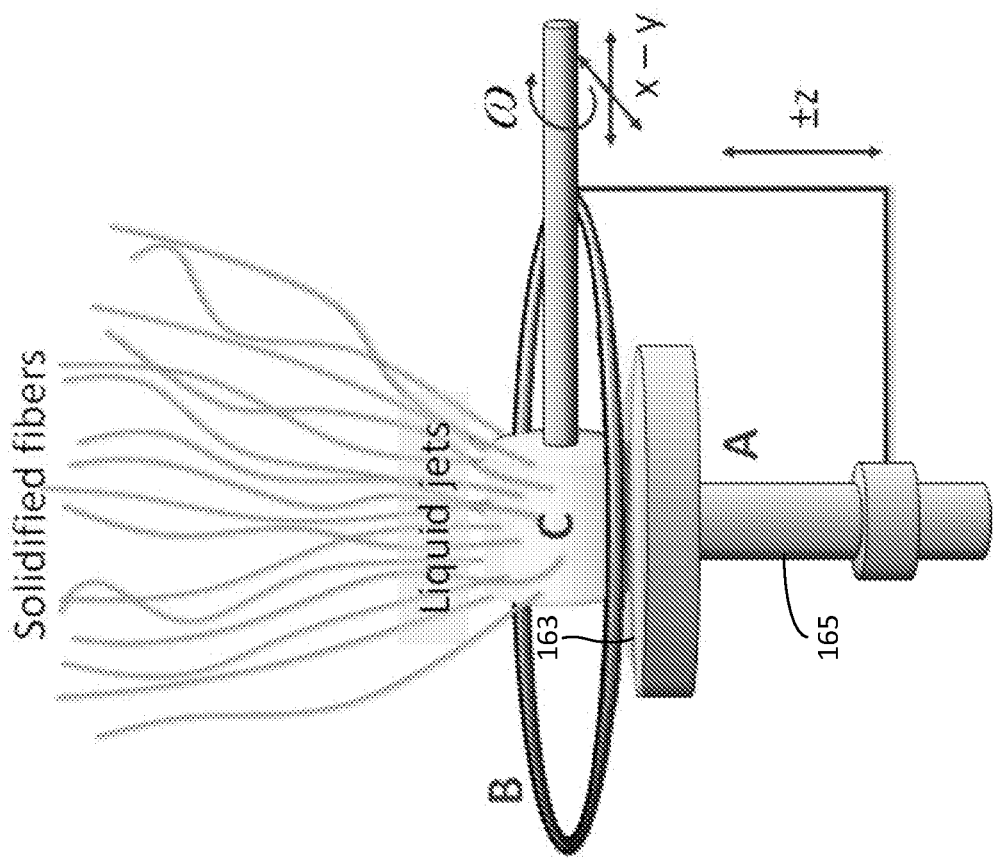
FIG. 17 is a side perspective view an electrode system configuration comprising components A, B and C in accordance with a representative embodiment.

FIG. 17 is a side perspective view an electrode system configuration comprising the component A electrode and components B and C in accordance with a representative embodiment. The addition of the precursor liquid attenuating component C, which is ideally made of low dielectric constant non-conductive material (e.g. Teflon or polypropylene, or other plastic), allows the problems described above with reference to FIG. 16 to be eliminated. In accordance with a representative embodiment, component C rotates and the electrically-charged precursor fluid 163 forms a layer on the surface of component C. The layer of precursor fluid 163 has a favorable convex shape that increases the number of jets produced per unit area, so the fiber production rate increases as well. Thus, there is no longer a need to maintain an optimum level of precursor fluid 163 on the component A electrode, and therefore spills and residue accumulation around the component A electrode are prevented.

The precursor liquid attenuating component C can have a variety of shapes or configurations. For example, it can be a cylinder, a disk, a sphere, a spiral, a screw-like shape, or a combination of thereof, and may have various surface profiles, such as, for example, a corrugated surface that modulates the fluid motion and further increases the jets production.

The precursor liquid attenuating component C can be one or more cylinders, disks, or rings of different diameters and thickness (length). The precursor liquid attenuating component C can be partially immersed in the liquid precursor 163 and can be rotated at various speeds (ω) in combination with linear x-y motion over the surface of the component A electrode. The working side of component C can be smooth or structured (e.g., having notches, holes, protrusions, etc.) to provide the retention of the liquid precursor 163. In some embodiments, the rotating coaxial component C disks are plastic (e.g., Teflon) discs that are 30 mm in diameter with channels along their rims placed in a rectangular Teflon component A electrode that is partially filled with liquid precursor 163. When disc assembly rotates, fibers are produced from each side of the rim along each disc. The length of the assembly comprising components A and C may be, for example, 100 mm, although the inventive principles and concepts are not limited with respect to the dimensions of the assembly or its components.

The AC field-attenuating component B can be used together with component C. The x, y, z position of component B typically should be below the x, y, z position of the topmost surface of component C to better shape and direct the fibrous flow. Depending on the shape and areas of component A electrode and component C, component C may be moved in x-y directions while rotating. The bottom side of component C may slide on the top surface of the component A electrode as it rotates or it can be positioned slightly above the top surface of the component A electrode so that component C comes into contact with the precursor fluid 163 as component C rotates, but does not come into direct contact with the top surface of the component A electrode.

FIGS. 18-20 schematically illustrate fiber generation during the AC-electrospinning process for different configurations of the electrode system and different conditions of the precursor fluid 163 relative to the component A electrode in accordance with representative embodiments. The field-attenuating component B electrode is not included, although it could be. Normally, the component A electrode has a dish- or cup-like shape, as shown in FIGS. 18-20. The level of the precursor fluid 163 needed to affect the fiber generation and the proper convex surface profile of it (FIG. 18) are predicted. However, there are currently no numerical models that describe the possible development of Faraday's instability in a viscous fluid layer under an AC-field, and associated with it, the appearance of a surface wave pattern that can promote jet formation. In any case, when the level of fluid 163 drops below the rim 167 of the component A electrode, no jets are produced (FIG. 19). A rotating plastic disc, cylinder, spiral, or screw-like shape comprising component C draws fluid out of the component A electrode (FIG. 20), and this charged fluid 163, due to the curved surfaces of component C, can easily form multiple jets, and thus fibrous flow is produced. In addition, as indicated above, use of component C typically increases fiber generation over electrode system configurations that do not include component C (FIG. 18). Adding the component B electrode to the configurations shown in FIGS. 18 and 20 would provide better control over the shape and direction of the fibrous flow.

It should be noted that illustrative embodiments have been described herein for the purpose of demonstrating principles and concepts of the invention. As will be understood by persons of skill in the art in view of the description provided herein, many modifications may be made to the embodiments described herein without deviating from the scope of the invention. For example, while the inventive principles and concepts have been described primarily with reference to particular tubular structures and electrode system configurations, the inventive principles and concepts are equally applicable to other tubular structures and electrode system configurations. Also, many modifications may be made to the embodiments described herein without deviating from the inventive principles and concepts, and all such modifications are within the scope of the invention, as will be understood by those of skill in the art.

What is claimed is:

1. A method for fabricating a tubular structure composed of nanofibers, the method comprising:
    (a) disposing an alternating current (AC)-spinnable or sprayable precursor liquid in a reservoir of an electrode system of an AC-electrospinning system, the reservoir comprising a non-electrically conducting material, the electrode system comprising an electrical charging component electrode having at least one contact point that is in contact with the precursor liquid; and
    (b) delivering an AC signal to the electrical charging component electrode from an AC source that is electrically coupled to the electrical charging component electrode to place a predetermined AC voltage on the electrical charging component electrode, wherein placement of the predetermined AC voltage on the electrical charging component electrode results in electrospinning at least a first layer of fibrous material onto a collector disposed near the electrode system that collects the first layer of fibrous material.

2. The method of claim 1, wherein the collector is rotated about a central axis of the collector at a preselected rotational speed during spinning of the first layer of fibrous material onto the collector.

3. The method of claim 2, wherein the preselected rotational speed is adjusted based on at least one of a speed of flow of the first layer of fibrous material onto the collector and a porosity or density of the collected first layer of fibrous material.

4. The method of claim 2, further comprising:
    (c) compressing the first layer of fibrous material.

5. The method of claim 4, further comprising:
    (d) using a heating element disposed in and/or around the collector to subject the compressed first layer of fibrous material to heat to calcine the compressed first layer of fibrous material.

6. The method of claim 5, further comprising:
    (e) after calcining the compressed first layer of fibrous material, spraying or spinning at least a second layer of fibrous material onto the compressed and calcined first layer of fibrous material.

7. The method of claim 6, further comprising:
    (f) after spraying or spinning the second layer of fibrous material onto the compressed and calcined first layer of fibrous material, calcining the second layer of fibrous material.

8. The method of claim 1, further comprising:
    exposing at least a portion of the tubular structure to a solution of inorganic material; and
    after exposing said at least a portion of the tubular structure to the solution of inorganic material, subjecting the tubular structure to a thermal treatment to provide the tubular structure with at least one of increased strength, additional functionality and suitability for integration into external devices or systems.

9. The method of claim 1, wherein the entire tubular structure has a porosity that is greater than or equal to 60%, and wherein a plurality of the layers of fibrous material have porosities greater that 80%.

10. The method of claim 7, wherein the collector is a multi-bore collector.

11. The method of claim 1, wherein the collector is a single-bore collector.

12. The method of claim 1, wherein the electrode system further comprises:
    at least one of an AC field attenuating component and a precursor liquid attenuating component.

13. The method of claim 12, wherein the electrode system comprises the AC field attenuating component, but not the precursor liquid attenuating component, and wherein the predetermined AC voltage is also placed on the AC field attenuating component, and wherein the AC field attenuating component attenuates an AC field created by the placement of the predetermined AC voltage on the electrical charging component electrode.

14. The method of claim 13, wherein the electrical charging component electrode is doughnut-shaped, disk-shaped or rectangularly-shaped.

15. The method of claim 13, wherein the electrical charging component electrode has a top surface and a rim or lip that together define the reservoir such that the top surface of the electrical charging component electrode serves as a bottom of the reservoir.

16. The method of claim 12, wherein the electrode system comprises the precursor liquid attenuating component, but not the AC field attenuating component, wherein the electrical charging component electrode has a top surface and a rim or lip that together define the reservoir for holding precursor liquid such that the top surface of the electrical charging component electrode serves as a bottom of the reservoir, and wherein the precursor liquid attenuating component facilitates fiber generation even in case where a level of the precursor liquid on the electrical charging component electrode is below the lip or rim of the electrical charging component electrode.

17. The method of claim 16, wherein the precursor liquid attenuating component is rotated as it contacts the precursor liquid.

18. The method of claim 1, wherein during spinning of the first layer of fibrous material, the collector is moved in at least one linear direction that is substantially parallel to the central axis of the collector, or the collector is moved in at least one linear direction that is substantially perpendicular to the central axis of the collector, or the collector is tilted such that the central axis of the collector is at a preselected angle that is greater than zero degrees and less than ninety degrees relative to a central axis of the electrical charging component electrode.

19. The method of claim 1, further comprising:
forming a sacrificial layer between the collector and the first layer of fibrous material that decomposes during calcination.

20. The method of claim 1, wherein calcination and/or sintering of the first layer of fibrous material is performed in an oxidizing atmosphere.

21. The method of claim 1, wherein calcination and/or sintering of the first layer of fibrous material is performed in a non-oxidizing atmosphere.

* * * * *